Jan. 15, 1963   J. E. RAISTAKKA   3,073,273
EMERGENCY AIR DEVICE FOR SUBMARINES
Filed Nov. 27, 1961
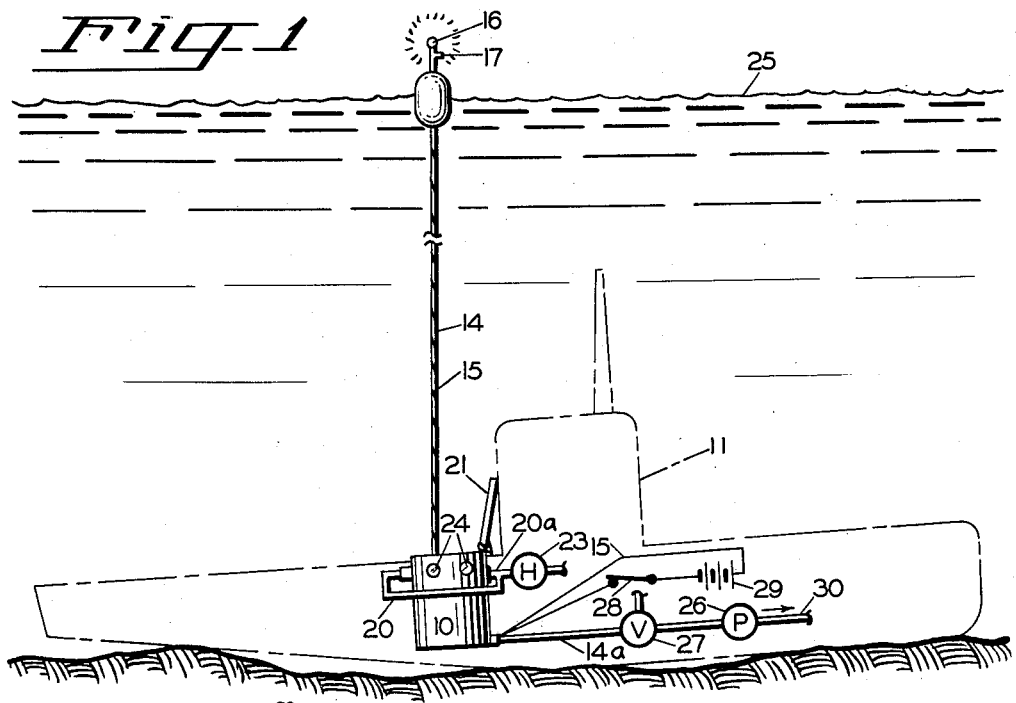
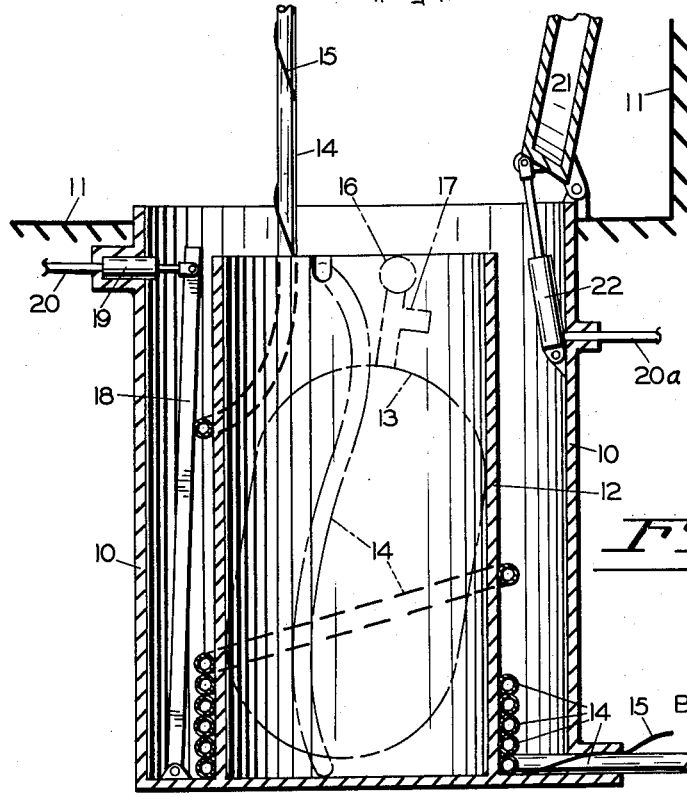
INVENTOR
JOHN E. RAISTAKKA
BY *Kimmel & Crowell*
ATTORNEYS

3,073,273
EMERGENCY AIR DEVICE FOR SUBMARINES
John E. Raistakka, 1414 SW. 12th Ave., Portland, Oreg.
Filed Nov. 27, 1961, Ser. No. 155,130
1 Claim. (Cl. 114—16.5)

This invention relates to a device for providing fresh air to disabled submarines in times of emergency.

The primary object of this invention is to supply air to the ballast tanks of a submarine to give it buoyancy and enable it to rise to the surface, even after its primary machinery has been disabled.

Another object is to furnish fresh air to the crewmen in order that they may survive long periods of time submerged.

A further object is to pump the fresh air, using the submarine's own auxiliary power, into the ballast tanks and crew compartments, or to have the air forced down to the submarine by a surface rescue vessel.

Still other objects of this invention will in part be obvious and in part be pointed out hereinafter and shown in the accompanying drawing wherein:

FIGURE 1 is a side elevation of one form of device embodying this inventive concept within a submarine, shown in dotted lines, with the air hose running to the surface and the operative power units shown diagrammatically, and FIGURE 2 is an enlarged cross-sectional view of this device revealing its inner structure and mechanisms.

Similar reference characters refer to similar parts throughout the several views of the drawing.

This device consists of a large outer cylindrical container 10 which is of suitable depth and diameter to contain the component parts of this device within the submarine 11, shown in broken line in FIG. 1. Referring specifically to FIG. 2, an inner cylindrical container 12 is located within and integral with the outside container 10. Within the inner container 12 is located and stowed a buoyant float 13 which carries an air hose 14 to the surface when released. The air hose 14 carries with it electric power wires 15, controlling a signal light 16, located on the top side of float 13. The air hose 14 and associated electric wires 15 run through the center of flat 13, with the air hose terminating with an air intake connector opening 17, through which fresh air may be sucked by the submarine's auxiliary power, or air may be forced therethrough by a surface rescue vessel.

The air hose 14 is preferably stowed inside the outer container 10 by coiling about the outside perimeter of the inner container 12, as illustrated in FIG. 2. A hydraulically operated friction brake 18 controls the rate of speed at which the air hose 14 is allowed to be fed out and pulled to the water surface by float 13. The hydraulic brake is activated by a hydraulic cylinder and piston 19 fed by the hydraulic fluid line 20 and controlled by suitable controls (not shown) within the submarine 11. Also hydraulically operated is the outside hatch 21 which, when opened, allows the float 13 to be released from the inner container 12 and pull the air hose 14 and its associated wires 15 to the surface. The outside hatch 21 is operated by a hydraulic cylinder and piston 22 which is also fed by the hydraulic fluid line 20a by means of a hydraulic pump 23, as seen diagrammatically in FIG. 1. The afore-mentioned hydraulic brake 18 and the hatch 21 may be operated manually by suitable means (not shown) in the event that the auxiliary hydraulic system is rendered inoperative.

In the operation of this device, when the submarine 12 is disabled, suitable hydraulic controls (not shown) open the outside hatch 21 which releases the float 13 from within the inner container 12. Since at the depths that a disabled submarine will be located, the outside water pressure may be such that the outside hatch 21 will not open, even with the greatest effort of the hydraulic cylinder 22, the inside pressure of the cylindrical container 10 must closely equal the force exerted by the outside water pressure. To equalize this pressure sufficient air is pumped out of the remaining air in the ballast tanks (not shown) from a line 30, by a reversible pump 26, through a valve 27 in an air line 14a and air hose 14, thence out through the air-intake connector opening 17. This exerts an equalizing pressure on the underside of the outside hatch 21. The equalizing pressure is only needed briefly until the outside hatch 21 is cracked open enough for the outside water to fill the cylindrical container 10. It will be noted that the outer container 10 is water tight, thus preventing the submarine from becoming flooded. Conventional means of equalizing pressure may also be employed such, for example, as filling the outer container 10 with water through a suitable valve (not shown) in the outside hatch 21.

As the float 13 ascends to the water surface it pulls the air hose 14 and its associated electrical wires 15 with it. A multiplicity of watertight viewing ports 24 are provided in the outer container 10 for the purpose of observing, from within the submarine 11, the feeding out of the air hose 14 to better control the rate of speed of the ascent of said hose 14 and float 13 by use of the hydraulically operated friction brake 18.

When the float 13 is on the water surface 25, seen in FIG. 1 the air suction pump 26 is activated and the air-intake valve 27 is used to control the distribution of the fresh air. If it is desired to use the signal light 16, an electrical switch 28 is closed and current is now supplied to said signal light 16 from an emergency battery 29. When a surface rescue vessel arrives, it merely attaches a suitable air hose to the air-intake connector 17 and pumps fresh air downward to the submarine 11 through the air hose 14. Such air may be used to fill the ballast tanks through line 30 to refloat the submarine as well as to supply breathable air to the trapped crew of the vessel.

In addition to the electrical signal wires 15, telephone wires, or any other wires, may also be incorporated with the air hose 14.

As many embodiments may be made of this inventive concept, and as many modifications may be made in the embodiment hereinbefore shown and described, it is to be understood that all matter herein is to be interpreted merely as illustrative, and not in a limiting sense.

I claim:

In combination with a submarine, a fluid tight tank in said submarine, a hatch normally closing said tank and opening to the surrounding water, a receptacle centrally positioned in said tank, a buoy in said receptacle, an air hose having one end extending through said buoy, an air intake pipe extending from the top of said buoy and having a lateral inlet pipe extending therefrom, a light on the top of said intake pipe, said air hose coiled around said receptacle, a pipe connecting the other end of said air hose with the interior of the submarine, a valve in said last-mentioned pipe, a reversible pump connected to the other end of said last-mentioned pipe, a battery in said submarine, a wire extending from said battery wound about said air hose and connected to said light, hydraulic means for opening said hatch, a hydraulic friction tube operable against the coiled portion of said hose for retarding the speed at which said hose is fed out, and a hydraulic pump internally of said submarine for actuating said hydraulic hatch opening means and said hydraulic valve.

References Cited in the file of this patent

UNITED STATES PATENTS

| | | |
|---|---|---|
| 1,178,407 | Okusa | Apr. 4, 1916 |
| 1,598,573 | German | Aug. 31, 1926 |
| 1,613,594 | Webb | Jan. 4, 1927 |
| 1,728,882 | Shimizu | Sept. 17, 1929 |
| 1,738,385 | Moody | Dec. 3, 1929 |
| 1,765,233 | Johnson | June 17, 1930 |
| 2,682,245 | Pinch | June 29, 1954 |
| 2,820,515 | Aarvold | Jan. 21, 1958 |
| 2,910,031 | Greer | Oct. 27, 1959 |